US011818609B2

(12) United States Patent
Navrátil et al.

(10) Patent No.: US 11,818,609 B2
(45) Date of Patent: Nov. 14, 2023

(54) MOBILITY IN CELLULAR COMMUNICATION NETWORKS

(71) Applicant: Nokia Technologies Oy, Espoo (FI)

(72) Inventors: David Navrátil, Helsinki (FI); Philippe Godin, Versailles (FR); Esa Mikael Malkamäki, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/949,739

(22) Filed: Sep. 21, 2022

(65) Prior Publication Data

US 2023/0180063 A1 Jun. 8, 2023

(30) Foreign Application Priority Data

Dec. 3, 2021 (FI) ..................................... 20216243

(51) Int. Cl.
  *H04W 4/00* (2018.01)
  *H04W 36/00* (2009.01)
  *H04W 36/30* (2009.01)
(52) U.S. Cl.
  CPC ....... *H04W 36/0007* (2018.08); *H04W 36/30* (2013.01)
(58) Field of Classification Search
  CPC ........................ H04W 36/0007; H04W 36/30
  USPC ......................................................... 370/331
  See application file for complete search history.

(56) References Cited

U.S. PATENT DOCUMENTS

| 8,054,836 | B2 | 11/2011 | Fischer |
| 10,225,779 | B2 * | 3/2019 | Xu .......................... H04W 36/30 |
| 11,115,885 | B2 | 9/2021 | Sridhara et al. |
| 2015/0124748 | A1 * | 5/2015 | Park ....................... H04W 72/21 370/329 |

(Continued)

FOREIGN PATENT DOCUMENTS

| EP | 2111073 A1 | 10/2009 |
| WO | 2009/011621 A1 | 1/2009 |

(Continued)

OTHER PUBLICATIONS

"Reply LS on maximum number of MBS sessions that can be associated to a PDU session", 3GPP TSG-SA WG2 Meeting #148E, S2-2108404, Ericsson, Nov. 15-22, 2021, 2 pages.

(Continued)

*Primary Examiner* — Amancio Gonzalez
(74) *Attorney, Agent, or Firm* — Nokia Technologies Oy

(57) ABSTRACT

A method comprises receiving a handover request from a source BS, the handover request comprising a request for a handover of a UE involved in at least two QoS flows using a first MRB with the source BS, wherein the apparatus is using at least a second MRB for other UEs; starting to buffer packets for the UE; receiving a subsequent message comprising, for each of the at least two QoS flows, a CN SN of a first packet not transmitted by the source BS for that QoS flow; identifying a second packet with the highest protocol entity SN according to a protocol entity transmission order of the second MRB among packets which the source BS has delivered to the UE using the first MRB and the apparatus has transmitted to the other UEs using the second MRB; and transmitting a message configuring the UE to use the second MRB.

19 Claims, 9 Drawing Sheets

(56) References Cited

U.S. PATENT DOCUMENTS

| | | | |
|---|---|---|---|
| 2016/0057663 A1* | 2/2016 | Teyeb | H04W 36/0069 |
| | | | 455/436 |
| 2016/0249259 A1* | 8/2016 | Park | H04W 36/0058 |
| 2021/0289471 A1* | 9/2021 | Zhu | H04W 36/0007 |
| 2022/0256505 A1* | 8/2022 | Qi | H04W 28/0263 |
| 2022/0264258 A1* | 8/2022 | Zong | H04W 72/23 |
| 2022/0408162 A1* | 12/2022 | Jia | H04N 21/6408 |
| 2023/0029292 A1* | 1/2023 | Jia | H04W 36/0011 |

FOREIGN PATENT DOCUMENTS

| | | |
|---|---|---|
| WO | 2011/079478 A1 | 7/2011 |
| WO | 2021/143868 A1 | 7/2021 |
| WO | 2021/164400 A1 | 8/2021 |

OTHER PUBLICATIONS

"NR MBS user plane aspects", 3GPP TSG-RAN WG2 Meeting #116e, R2-2109900, Agenda: 8.1.2, Qualcomm Inc, Nov. 1-12, 2021, 3 pages.

"3rd Generation Partnership Project; Technical Specification Group Services and System Aspects; Architectural enhancements for 5G multicast-broadcast services; Stage 2 (Release 17)", 3GPP TS 23.247, V17.0.0, Sep. 2021, pp. 1-94.

"MBS Mobility", 3GPP TSG-RAN WG2 Meeting #116 Electronic, R2-2109954, Agenda: 8.1.2.1, Nokia, Nov. 1-12, 2021, 6 pages.

"3rd Generation Partnership Project; Technical Specification Group Radio Access Network; NR; NR and NG-RAN Overall Description; Stage 2 (Release 16)", 3GPP TS 38.300, V16.7.0, Sep. 2021, pp. 1-152.

"Inter-cell mobility for MBS", 3GPP TSG-RAN WG2 Meeting #116-e, R2-2110599, Agenda: 8.1.2.1, Huawei, Nov. 1-12, 2021, 4 pages.

Office action received for corresponding Finnish U.S. Appl. No. 20/216,243, dated Jun. 17, 2022, 8 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.6.0, Jun. 2021, pp. 1-391.

* cited by examiner

MOBILITY IN CELLULAR COMMUNICATION NETWORKS

RELATED APPLICATION

This application claims priority from FI application No. 20216243 filed on Dec. 3, 2021, which is hereby incorporated in its entirety.

FIELD

Various example embodiments relate in general to cellular communication networks and more specifically, to mobility of user equipments receiving multicast and/or broadcast in such networks.

BACKGROUND

Mobility of wireless terminals, such as User Equipment, UEs, needs to be enabled in various wireless communication networks and handovers may be exploited for ensuring that a wireless terminal may move without experiencing significant connectivity issues. For instance, mobility is very important in cellular networks, such as in networks operating according to Long Term Evolution, LTE, and/or 5G radio access technology. 5G radio access technology may also be referred to as New Radio, NR, access technology. Since its inception, LTE has been widely deployed and 3rd Generation Partnership Project, 3GPP, still develops LTE. Similarly, 3GPP also develops standards for 5G/NR. One of the topics in the 3GPP discussions is related to handovers and there is a need to provide improved methods, apparatuses and computer programs related to mobility and handovers.

SUMMARY

According to some aspects, there is provided the subject-matter of the independent claims. Some embodiments are defined in the dependent claims. The scope of protection sought for various embodiments of the invention is set out by the independent claims. The embodiments and features, if any, described in this specification that do not fall under the scope of the independent claims are to be interpreted as examples useful for understanding various embodiments of the invention According to a first aspect of the present invention, there is provided an apparatus comprising at least one processing core, at least one memory including computer program code, the at least one memory and the computer program code being configured to, with the at least one processing core, cause the apparatus at least to perform, receive a handover request from a source base station, the handover request comprising a request for a handover of a user equipment involved in at least two Quality of Service, QoS, flows using a first multicast and broadcast service radio bearer, MRB, with the source base station, wherein the apparatus is using at least a second MRB for other user equipments, start, responsive to receiving the handover request, to buffer packets for the user equipment, receive a subsequent message, from the source base station comprising for each of the at least two QoS flows, a core network sequence number of a first packet not transmitted by the source base station for that QoS flow, identify, based on the core network sequence number of the first packet for each of the at least two QoS flows, a second packet with the highest protocol entity sequence number according to a protocol entity transmission order of the second MRB for said other user equipments among packets which the source base station has already delivered to the user equipment using the first MRB and the apparatus has transmitted, or will transmit, to the other user equipments using the second MRB and transmit, after the transmission of the second packet to said other user equipments using the second MRB, a configuration message configuring the user equipment to use the second MRB comprising at least a point-to-multipoint leg. The apparatus may be a target base station or a control device configured to control the target base station, possibly when installed therein.

According to a second aspect of the present invention, there is provided a method for comprising receiving a HO request from a source BS, the HO request comprising a request for a HO of a UE involved in at least two QoS flows using a first MRB with the source BS, wherein the target BS is using at least a second MRB for other UE, starting, responsive to receiving the HO request, to buffer packets for the UE, receiving a subsequent message, from the source BS comprising for each of the at least two QoS flows, a CSN of a first packet not transmitted by the source BS for that QoS flow, identifying, based on the CSN of the first packet for each of the at least two QoS flows, a second packet with the highest protocol entity sequence number according to a protocol entity transmission order of the second MRB for said other UEs among packets which the source BS has already delivered to the UE using the first MRB and the target BS has transmitted, or will transmit, to the other UEs using the second MRB and transmitting, after the transmission of the second packet to said other UEs using the second MRB, a configuration message configuring the UE to use the second MRB comprising at least a PTM leg.

According to a third aspect of the present invention, there is provided an apparatus comprising means for receiving a handover request from a source base station, the handover request comprising a request for a handover of a user equipment involved in at least two Quality of Service, QoS, flows using a first multicast and broadcast service radio bearer, MRB, with the source base station, wherein the apparatus is using at least a second MRB for other user equipments, means for starting, responsive to receiving the handover request, to buffer packets for the user equipment, means for receiving a subsequent message, from the source base station comprising for each of the at least two QoS flows, a core network sequence number of a first packet not transmitted by the source base station for that QoS flow, means for identifying, based on the core network sequence number of the first packet for each of the at least two QoS flows, a second packet with the highest protocol entity sequence number according to a protocol entity transmission order of the second MRB for said other user equipments among packets which the source base station has already delivered to the user equipment using the first MRB and the apparatus has transmitted, or will transmit, to the other user equipments using the second MRB and means for transmitting, after the transmission of the second packet to said other user equipments using the second MRB, a configuration message configuring the user equipment to use the second MRB comprising at least a point-to-multipoint leg. The apparatus may be a target base station or a control device configured to control the target base station, possibly when installed therein.

According to a fourth aspect of the present invention, there is provided a non-transitory computer readable medium having stored thereon a set of computer readable instructions that, when executed by at least one processor, cause an apparatus to at least perform the method. According to a fifth aspect of the present invention, there is provided a computer program configured to perform the method.

EMBODIMENTS

Mobility of User Equipments, UEs, may be improved by the procedures described herein. More specifically, mobility of UEs involved in Multicast and Broadcast Service, MBS, sessions may be improved by the procedures described herein.

Figure 1:
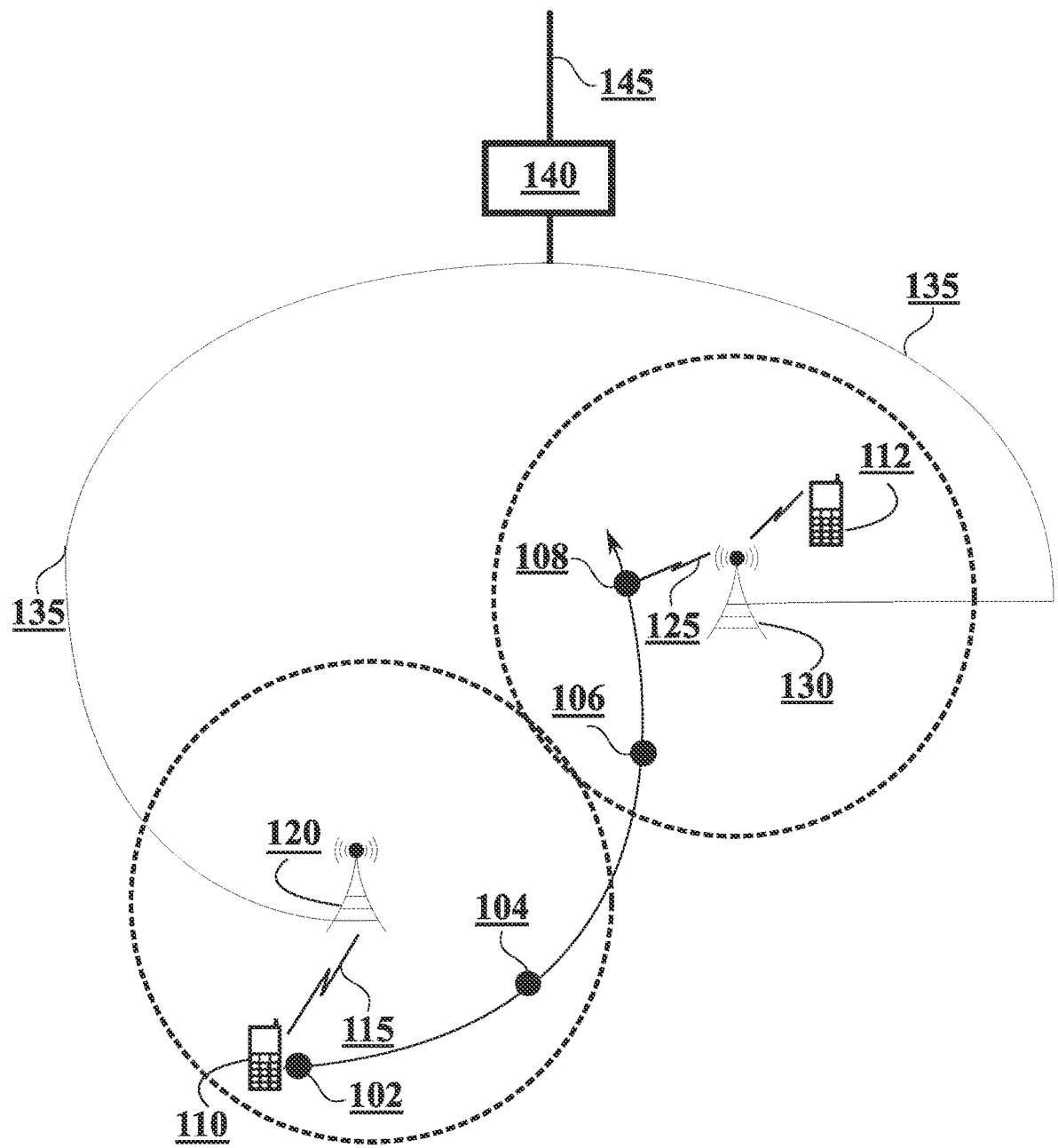
FIG. 1 illustrates a cellular communication network in accordance with at least some example embodiments.

FIG. 1 illustrates an exemplary communication network in accordance with at least some embodiments. The exemplary communication network of FIG. 1 may comprise a cellular communication system, which may further comprise UE 110, source BS 120 and target BS 130. Source BS 120 may also comprise, or be associated with, at least one cell. Target BS 130 may comprise, or be associated with, at least one cell as well.

Source BS 120 may be a source BS for the handover of UE 110 while target BS 130 may be a target BS for the handover of UE 110. Thus, a cell of source BS 120 may be referred to as a source cell for the handover and a cell of target BS 130 may be referred to as a target cell for the handover. The exemplary communication network may also comprise core network 140.

Locations of UE 110 at different time instants are denoted by points 102, 104, 106 and 108 in FIG. 1. UE 110 may be located at point 102 before the handover and be connected to source BS 120 via air interface 115. Then, UE 110 may start moving from point 102 towards target BS 130 via points 104 and 106. At point 108, UE 110 may have performed the handover. Thus, at point 108 UE 110 may be connected to target BS 130 via air interface 125. In some embodiments, another UE 112 may be connected to target BS 130 via air interface 125 at the same time as well.

Source BS 120 and target BS 130 may be connected to each other directly via wired interface 135, such as a X2 or Xn interface. Source BS 120 and target BS 130 may be connected, directly or via at least one intermediate node, with core network 140 as well. Core network 140 may be, in turn, coupled via wired interface 145 with another network (not shown in FIG. 1), via which connectivity to further networks may be obtained, for example via a worldwide interconnection network. Source BS 120 and target BS 130 may be connected with at least one other BS as well via at least one inter-BS interface (not shown in FIG. 1), even though in some example embodiments the at least one inter-BS interface may be absent.

UE 110 may comprise, for example, a smartphone, a cellular phone, a Machine-to-Machine, M2M, node, Machine-Type Communications node, MTC, an Internet of Things, IoT, node, a car telemetry unit, a laptop computer, a tablet computer or, indeed, any kind of suitable mobile wireless terminal or station. In some example embodiments, source BS 120 may be considered as a serving BS for UE 110 before the handover while target BS 130 may be considered as a serving BS for UE 110 after the handover.

Air interface 115 between UE 110 and source BS 120 may be configured in accordance with a first Radio Access Technology, RAT, which UE 110 and source BS 120 are configured to support, and UE 110 may communicate with source BS 120 via air interface 115 using the first RAT before the handover. Similarly, air interface 125 between UE 110 and target BS 130 may be configured in accordance with a second RAT, which UE 110 and target BS 130 are configured to support, and UE 110 may communicate with target BS 130 via air interface 125 using the second RAT after the handover.

The first RAT and the second RAT may be the same. Examples of cellular RATs include Long Term Evolution, LTE, New Radio, NR, which may also be known as fifth generation, 5G, radio access technology and MulteFire. For instance, in the context of LTE, a BS may be referred to as eNB while in the context of NR, a BS may be referred to as gNB. In any case, embodiments are not restricted to any particular wireless technology. Instead, embodiments may be exploited in any wireless communication system wherein it is desirable ensure proper connectivity for mobile devices using MBSs.

Figure 2:
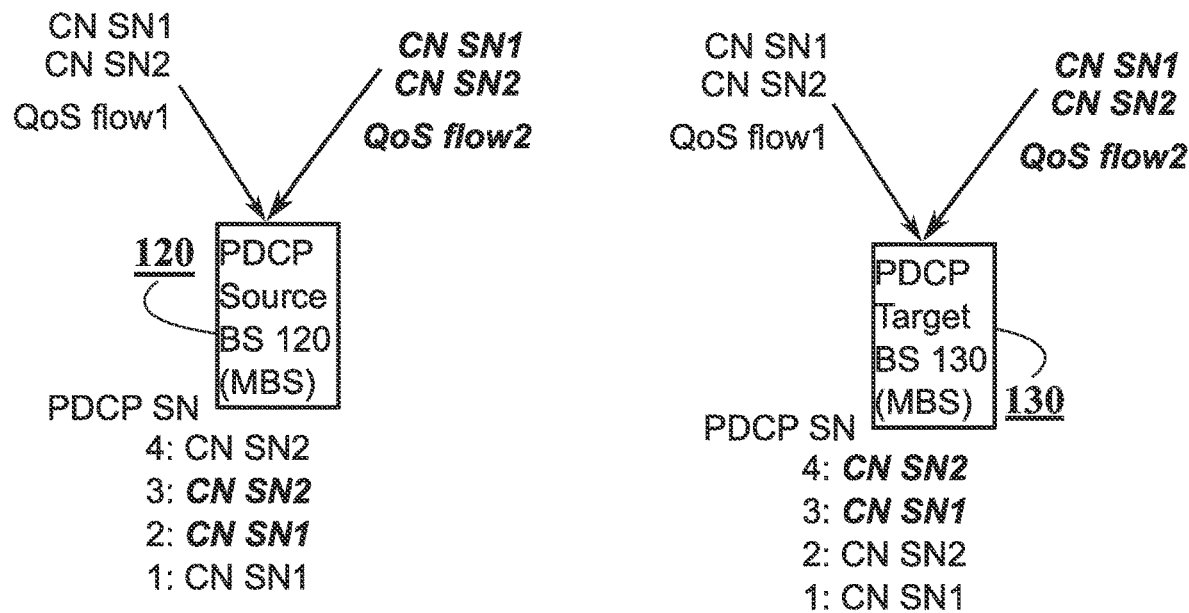
FIG. 2 illustrates a mismatch between the content of PDCP PDUs in accordance with at least some example embodiments.

FIG. 2 illustrates a mismatch between the content of PDCP PDUs. To support lossless handover for a MBS Radio Bearer, MRB, source BS 120 and target BS 130 may apply the same mapping of Quality of Service, QoS, flows to the MRB. The same may apply for a Data Radio Bearer, DBR. At least one potential issue with multicast QoS flows, i.e., QoS flows of one MBS session, and MRBs is that source BS 120 and target BS 130 may have started to serve the MBS session before any mobility occurred.

If target BS 130 should be able to continue using the existing MRB configured to UE 110 in the target cell, source BS 120 and target BS 130 must map the same GPRS Tunnelling Protocol—User data tunnelling, GTP-U, Protocol Data Unit, PDU, to Packet Data Convergence Protocol, PDCP, PDU with the same PDCP Sequence Number, SN. This is only guaranteed if 1:1 mapping between multicast QoS flow and MRB is used as there may be no coordination between source BS 120 and target BS 130 regarding an order in which PDUs of multiple QoS flows should be mapped to PDCP PDUs. Therefore, 1:1 mapping may be used if lossless (requires Point-To-Point, PTP, leg with Radio Link Control, RLC, Acknowledged Mode, AM) or seamless (for MRBs using RLC Unacknowledged Mode, UM) handover is to be supported.

The combined number of DRBs and MRBs that UE 110 supports may be for example 16. Even though some UEs may support more radio bearers, it seems not feasible to assume 1:1 mapping between MBS QoS flows and MRBs because the number of supported MBS multicast sessions and MBS QoS flows could be smaller than the proposed 32 multicast session. It should be noted that for example a MBS session may have more than one QoS flow, e.g., one QoS flow for audio content and one QoS flow for visual content.

Considering the example shown in FIG. 2, if UE 110 is handed over from source BS 120 to target BS 130 after receiving a PDCP PDU with a SN equal to 2 and arriving at target BS 130 before the transmission of a PDCP PDU with a SN equal to 3, UE 110 will understand the content (PDCP Service Data Unit, SDU) carried by PDCP PDU with the SN equal to 3 as being a new data and deliver the user plane PDU associated with CN SN1 to upper layers. This would cause the delivery of duplicates because the user plane PDU associated with Core Network Sequence Number 1 of QoS flow2, CN SN1, which may be referred to as CSN as well in some embodiments, was already delivered to upper layers when UE 110 received the PDCP PDU with the SN equal to 2 from source BS 120. Embodiments of the present invention address this issue by enabling seamless and duplicate free mobility, and even lossless when RLC AM is used, supporting 1:N mapping between MRB and QoS flows.

FIG. 2 illustrates that the mapping from QoS flows to MRB may be different in different cells/BSs. In FIG. 2, the number in front is the PDCP SN and CN SNx gives the corresponding CN SN of the packet, as shown in Tables 1 and 2 below.

TABLE 1

Source BS 120

| PDCP SN | Payload | Comment |
|---|---|---|
| 4 | CSN2 = 2 | Received, not transmitted |
| 3 | CSN1 = 2 | Transmitted & discarded |
| 2 | CSN2 = 1 | Transmitted & discarded |
| 1 | CSN1 = 1 | Transmitted & discarded |

TABLE 2

Target BS 130

| PDCP SN | Payload | Comment |
|---|---|---|
| 4 | CSN2 = 2 | not yet received |
| 3 | CSN2 = 1 | Received, not transmitted |
| 2 | CSN1 = 2 | Transmitted & discarded |
| 1 | CSN1 = 1 | Transmitted & discarded |

Figure 3:
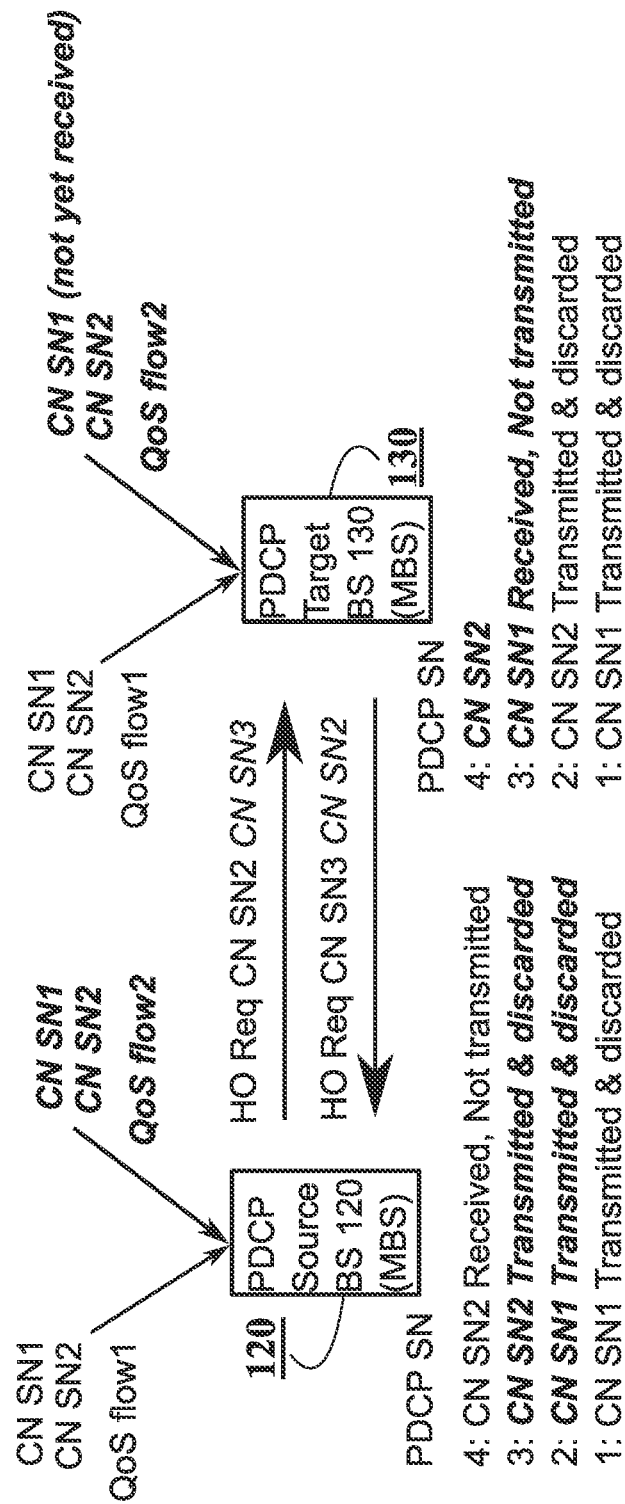
FIG. 3 illustrates a potential issue with forwarding in accordance with at least some example embodiments.

FIG. 3 illustrates a potential issue with forwarding in accordance with at least some example embodiments. FIG. 3 illustrates that the mapping from QoS flows to MRB may be different in different cells/BSs in the same way as FIG. 2 and shown in Tables 1 and 2.

Source BS 120 may inform target BS 130 about a current CN SN, for each QoS flow that corresponds to a foremost packet for which either the RLC Acknowledgement, ACK, is not received or the transmission has not taken place yet. Target BS 130 may respond with its current CSNs. Source BS 120 thus knows that CSN2 of QoS flow 1 should be forwarded to target BS 130 for transmission over a PTP leg in order to minimize data loss. The issue here is that the PDCP entity may be shared by PTP and Point-To-Multipoint, PTM, leg and hence target BS 130 cannot transmit forwarded data using the PDCP entity shared by all UEs, and PTP and PTM legs. Moreover, UE 110 should not receive a PDCP PDU with a sequence number 4 because it will carry CSN2 of QoS flow 2 which UE 110 already received from source BS 120. It is noted that CSN1 of QoS flow 2 is lost but it will not be retransmitted as PTM RLC UM transmission is assumed in this example.

In general, CSN1 may refer to a CSN number of a QoS flow, received by a BS and associated with a packet received over, e.g., N3mb, for the QoS flow 1 and CSN2 may refer to a CSN number of another QoS flow, received by a BS and associated with a packet received, e.g., over N3mb, for the QoS flow 2.

Embodiments of the present invention may be exploited to avoid at least the above mentioned issues. In some embodiments, a handover in a PTM or a PTP RLC UM may be performed. At a first step, target BS 130 may receive, from source BS 130, a Handover, HO, request comprising a CSN of a packet not delivered, e.g., not transmitted by BS 120 or acknowledged by UE 110, for each QoS flow. At a second step, target BS 130 may start, responsive to receiving the HO request, to buffer packets for UE 110. Target BS 130 may start buffering packets received from core network 140, e.g., over N3mb. The handover request may be for requesting a handover of UE 110, wherein UE 110 may be involved in at least two QoS flows using a first MRB (i.e. MRB1) with source BS 120. In some embodiments, target BS 130 may transmit the packets received from core network 140 to other UEs using, e.g., the second MRB. That is, target BS 130 may use at least the second MRB (i.e. MRB2).

In some embodiments, target BS 130 may transmit to source BS 120 a message, such as a HO request acknowledge message, comprising a configuration of a dedicated communication channel towards UE 110. Target BS 130 may indicate to source BS 120 in the HO request acknowledge message the CSNs of packets from which it starts buffering onwards for each QoS flow mapped to the second MRB. In some embodiments, target BS 130 may include a Radio Resource Control, RRC, HO Command reconfiguration message to setup the old MRB1 configuration towards UE 110 (i.e., between target BS 130 and UE 110). The indication of support to receive per QoS flow core network sequence numbers may be to include core network sequence number in the HO request acknowledge message.

At a third step, target BS 130 may receive from source BS 120 a message, such as a SN status transfer message, comprising for each of the at least two QoS flows, a CSN of a first packet not transmitted by BS 120 for that QoS flow yet. Source BS 120 may not stop transmitting during HO preparation and thus the CSN indicated in the third step may be larger than the CSN indicated in the first step.

At a fourth step, BS 130 may identify from the CSN received in the SN status transfer message those packets buffered at target BS 130 (called target P_oldx, where 'x' means QoS flow x), i.e., any packet with a CSN lower than the CSN received in the SN status transfer message at the third step, which have already been transmitted by source BS 120 for each QoS Flow. In an embodiment, target BS 130 may identify P_oldLast, defined as the last packet (i.e. the packet which will be transmitted by target BS 130 with the highest PDCP sequence number) of the P_oldx packets considering all the QoS Flows of the second MRB, and the order in which target BS 130 decides to process the packets in PDCP which may be different from source BS 120.

Target BS 130 may further identify at the fourth step, based on the CSN of the first packet for each of the at least two QoS flows, a second packet (P_oldLast) with the highest PDCP SN according to a PDCP transmission order for the second MRB for other user equipments among packets which the source base station has already delivered to UE 110 and target BS 130 has transmitted, or will transmit, to other UEs, like UE 112, using the second MRB.

At a fifth step, target BS 130 may receive over a forwarding tunnel from source BS 120 for each QoS Flow the PDCP SDUs not yet transmitted by source BS 120 to UE 110 which target BS 130 could not buffer, as indicated by the target BS 130 at the second step. These packets need not be received with an associated PDCP SN. For instance, target BS 130 may determine that a first set comprising packets not delivered by source BS 120 further comprises at least one packet not buffered by target BS 130, and receive from source BS 120 any such packet(s).

At a sixth step, target BS 120 may send e.g. over the first MRB the PDCP PDUs of PDCP SDUs received over the forwarding tunnel using a PDCP SN of the first MRB (i.e., in continuation for the first MRB1) as indicated at the third step. Target BS 130 may transmit to UE 110 the at least one packet comprised in the first set but not buffered by target BS 130 before transmitting other packets in the first set to UE 110, wherein the at least one packet is allocated with a SN subsequent to a last SN used by source BS 120 for the first MRB.

At a seventh step, target BS 130 may send the PDCP PDUs corresponding to PDCP SDUs buffered at target BS 130 using the first MRB PDCP SN, i.e. the packets which are allocated in continuation of the PDCP SN used for the last forwarded packet transmitted over the first MRB at the sixth step, instead of the PDCP SN which was used by target BS 130 to send the same packet over the second MRB PTM leg of target BS 130, while not transmitting the P_oldx packets. That is, target BS 130 may transmit, at least the first set of at least one packet over the dedicated communication channel to UE 110 using a PDCP transmission order of the dedicated communication channel.

The seventh step may be repeated until a predetermined condition is fulfilled, the condition being that a last buffered packet of the first set has already been sent over the second MRB PTM leg.

At an eighth step, after target BS 130 transmitted the P_oldLast packet to other UEs using the second MRB (PTM leg of the second MRB), target BS 130 may set up a split second MRB for UE 110 and send subsequently buffered packets over a PTP leg of the split second MRB to UE 110 now using the PDCP SN of the second MRB until catching up with the PDCP PDUs sent over a PTM leg of the split second MRB to other UEs, like UE 112, of target BS 130, i.e., a target cell of the HO of UE 110.

In some embodiments, target BS 130 may at the second step include an RRC HO command reconfiguration message to setup the non-split MRB2 PTP (i.e., a MRB with PTP leg only) configuration towards UE 110. In such case, the MRB1 configuration need not take place. In such a case, the packets may be sent over this non-split MRB2 PTP bearer at the sixth and seventh steps. This embodiment may have more complex implementation, because at target BS 130 separate individual (per UE) PDCP entities are required on MRB2 and also separate buffering to be able to allocate the PDCP SN as would have been sent over the first MRB, i.e., different than the "common PDCP entity" of the second MRB. At the eighth step, target BS 130 may reconfigure the non-split MRB2 PTP bearer for UE 110 into a split second MRB to enable UE 110 to receive packets over a PTM leg as well. The catch happens over the PTP leg.

In some embodiments, if only duplicate free mobility is required and packet loss is acceptable, at the second step target BS 130 may configure the second MRB with a PTP leg only (i.e., non-split MRB PTP without PTM). At the fourth step, target BS 130 may determine the P_oldx (i.e., packet(s) which source BS 120 has already transmitted) for each QoS flows. There may be no forwarding of data from source BS 120 to target BS 130 though. Target BS 130 may skip, on the second MRB PTP (i.e., PTP leg of the MRB2) the transmission of PDCP PDUs only carrying any P_oldx packet, hence resulting in gaps of received PDCP SNs at UE 110. Target BS 130 may indicate which PDCP SNs will not be transmitted due to this operation to UE 110, e.g., in the header of PDCP data PDU or in a PDCP control PDU, so that the receiving PDCP entity at UE 110 can deliver the received SDU(s) without waiting on the expiry of t-Reordering.

In some embodiments, a handover in PTP RLC AM may be performed similarly as in case of a PTM or a PTP RLC UM using the following additions. At the fifth step, the PDCP SDUs, which were sent to UE 110 at source BS 120 but not acknowledged by UE 110 at source BS 120, may be forwarded to target BS 130 associated with the PDCP SN which was used at source BS 120 to send them to UE 110. They are sent first before sending the PDCP SDUs not yet transmitted at source BS 120 to UE 110, wherein said PDCP SDUs are SDUs that the target could not buffer as per the indication sent at the second step.

The sixth step may not be changed meaning that due to the updated fifth step the packets sent over the first MRB (or PTP leg of MRB2) to UE 110 will be first the packets sent but not acknowledged to source BS 120 followed by the packets not yet transmitted by source BS 120 to UE 110 which the target could not buffer as per the indication sent at the second step, and yet possibly followed by packet the target BS 130 has buffered but which have not been transmitted by source BS 120. In some embodiments, in case of the handover in PTP RLC AM, the use of the first MRB may be substituted with the use of a non-split MRB2 PTP bearer as well.

Figure 4:
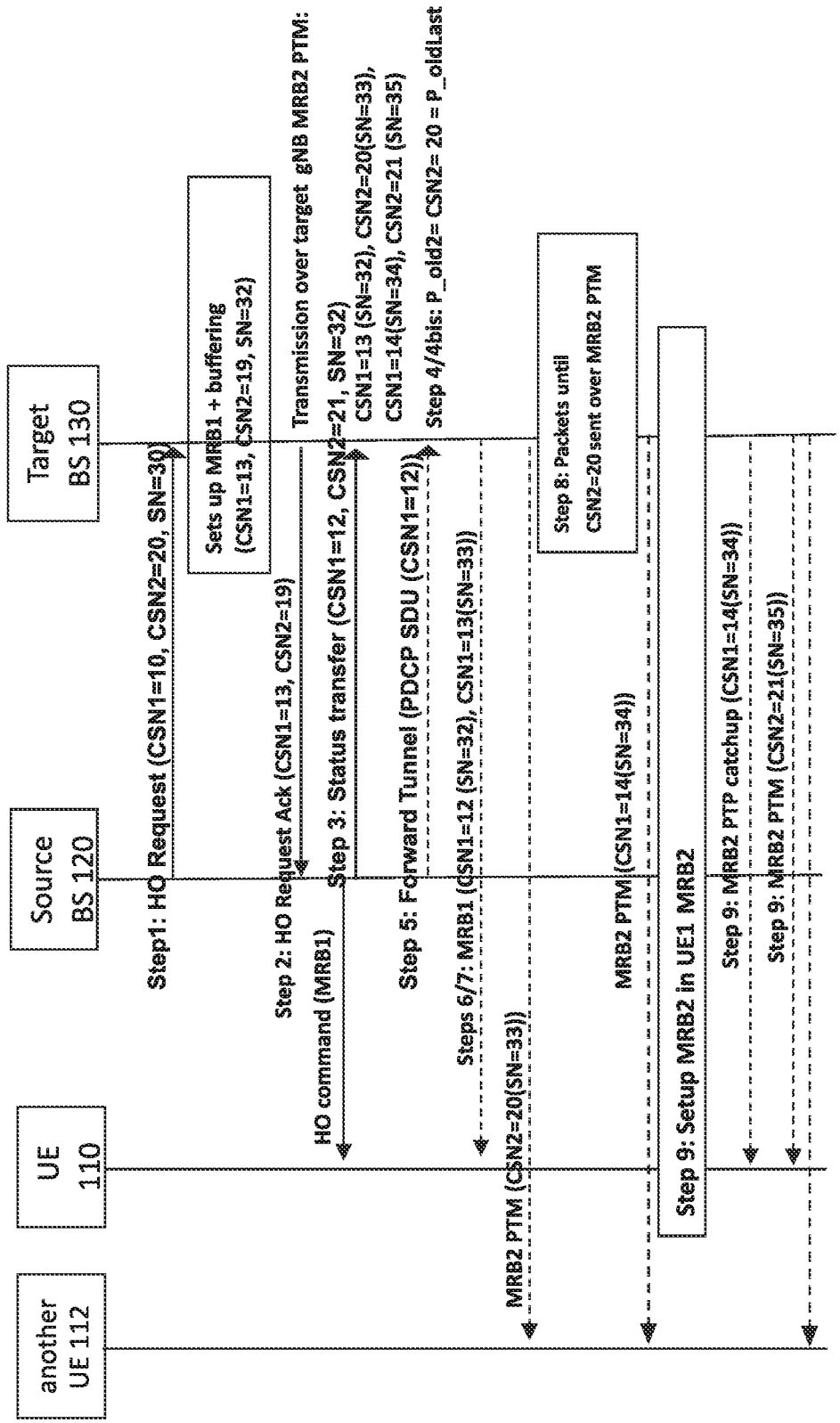
FIG. 4 illustrates a first exemplary signalling graph in accordance with at least some example embodiments.

FIG. 4 illustrates a first signalling graph in accordance with some example embodiments. With reference to FIG. 1, from the left to the right, another UE 112, UE 110, source BS 120 and target BS 130 are shown. In general, even though PDCP SNs are used as an example, embodiments of the present invention may be applied for any protocol entity SNs.

Source BS 120 may use the first MRB carrying MBS QoS flows 1 and 2 while target BS 130 may use at least the second MRB carrying MBS QoS flow 1 and 2. Even if the MBS QoS flows mapped to the first MRB at source BS 120 and the second MRB at target BS 130 may be the same, the mapping to PDCP SDU/PDUs may be different, e.g., the order of different CN packets may be different at source BS 120 and target BS 130. Transmission status at source BS 120 may be CSN1=11 (transmitted), CSN1=12 (not transmitted), CSN1=13 (not transmitted), CSN2=20 (transmitted), CSN2=21 (not transmitted).

At the first step shown in FIG. 4, target BS 130 may receive a HO request from source BS 120, the HO request comprising a request for a HO of UE 110. UE 110 may be involved in at least two QoS flows using a first MRB configuration with source BS 120. Responsive to receiving the HO request, target BS 130 may start buffering packets for UE 110. The first buffered packets may be CSN1=13 for QoS Flow 1 and CSN2=19 for QoS Flow 2.

At the second step shown in FIG. 4, target BS 130 may indicate to source BS 120 in the HO request acknowledge message that target BS 130 starts buffering onwards from CSN1=13 for QoS flow 1 and from CSN2=19 for QoS flow 2. Target BS 130 may also transmit a configuration message, such as an RRC HO command reconfiguration message, to request setting up the first MRB configuration between target BS 130 and UE 110, i.e., QoS flow to the first MRB mapping is maintained as indicated in the HO request from source BS 120 configuration towards UE 110. In some embodiments, the HO request acknowledge message may comprise a request by target BS 130 to receive per QoS flow core network sequence number. In some embodiments, the HO request acknowledge message may comprise a configuration of a dedicated communication channel.

At the third step shown in FIG. 4, target BS 130 may receive a subsequent message from source BS 120, the subsequent message comprising for each of the at least two QoS flows, a CSN of a first packet not transmitted by source BS 120 for that QoS flow. For instance, target BS 130 may receive from source BS 120 a SN status transfer message indicating that the first packet not yet delivered, i.e., transmitted by source BS 120 or acknowledged by UE 110 if transmitted, is CSN1=12 for QoS flow 1 and CSN2=21 for QoS flow 2. The subsequent message may be an XnAP or NG Application Protocol, NGAP, Status Transfer message.

At the fourth step shown in FIG. 4, target BS 130 may identify, based on the received CSN of the first packet not transmitted by source BS 120 (CSN1=12 and CSN2=21) for each of the at least two QoS flows, a second packet (P_oldLast) with the highest PDCP SN (SN=33) according to a PDCP entity transmission order for the second MRB for other UEs, like UE 112, among packets which source BS 120 has already transmitted to UE 110 and target BS 130 has transmitted, or will transmit, to the other UEs using the second MRB (i.e., among the packets with a core network sequence number lower than the received CSN of the first packet for each of the at least two QoS flows (i.e. P_oldx packets)). For instance, target BS 130 may identify from the CSNs received in the SN status transfer message that the second packet CSN2=20 buffered at target BS 130, called P_old2, has already been transmitted by source BS 120 for QoS Flow 2. At step 4bis target BS 130 may identify CSN2=20 as P_oldLast (i.e. the second packet) defined as the last one of the P_oldx packets considering all the QoS Flows of the second MRB.

At the fifth step shown in FIG. 4, target BS 130 may receive over the forwarding tunnel from source BS 120 the PDCP SDUs of CSN1=12 for QoS flow 1 as not yet delivered by source BS 120 to UE 110 which target BS 120 could not buffer as per the indication sent at the second step of FIG. 4. This indication needs not be received with an associated PDCP SN.

At the sixth step shown in FIG. 4, target BS may transmit over the first MRB (MRB1 in the figure), which uses the same configuration as first MRB in the source, the PDCP PDU of PDCP SDU of CSN1=12 received over the forwarding tunnel using a first MRB PDCP SN=32 (i.e. in continuation for the first MRB where last sent packet was SN=31) as per the indication received at the third step of FIG. 4.

Target BS 130 may identify a first set (CSN1=12 and CSN1=13) of at least one packet which were not delivered by source BS 120 to UE 110 and have a PDCP entity SN lower than, or equal to, the second packet (SN=33) according to the PDCP entity transmission order of the second MRB for other UEs, like UE 112. Target BS 130 may also identity, for each QoS flow for which target BS 130 is behind in packet transmission compared to source BS 120, a second set of at least one packet among the packets buffered at target BS 130 which have already been transmitted by source BS 120 to UE 110 and refrain from transmitting any packet in the second set to UE 110.

At the seventh step shown in FIG. 4, target BS 130 may transmit the first set of at least one packet buffered at target BS 130 which source BS 120 has not yet delivered (e.g. till PDCP SN=34) over the dedicated communication channel, like MRB1 or PTP MRB2, to UE 110 using a PDCP entity transmission order of the dedicated communication channel. The first set may be the minimum that shall be transmitted over the dedicated communication channel. For instance, target BS 130 use a MRB PTP to catch up if transmission of MRB2 PTM (CSN1=14 (SN=34)) took place before step 9.

The SN (SN=34) may be allocated for transmission of the at least one packet of the first set by target BS 130 based on the first MRB (MRB1) instead of a SN used for a previous transmission of the at least one packet of the first set by target BS 130 using the second MRB (MRB2). The SN used for transmission of the at least one packet of the first set may be subsequent to a SN of a last packet transmitted using the first MRB. The first MRB configuration may be different compared to the second MRB.

In general, the first set may comprise at least one packet not yet transmitted to UE 110 by source BS 120 and not buffered by target BS 130, at least one packet not yet transmitted to UE 110 the source BS 120 and buffered by target BS 130, and/or at least one packet transmitted to UE 110 by source 120 but for which source BS 120 has not received a reception acknowledgement from UE 110.

For instance, target BS 130 may transmit the PDCP PDU corresponding to PDCP SDU CSN1=13 buffered at target BS 130 using the first MRB PDCP SN=33 (i.e. which is allocated in continuation of the PDCP SN=32 used for the last forwarded packet transmitted over the first MRB at the sixth step, instead of the PDCP SN=32 which was used by target BS 130 to send the same packet over the second MRB PTM of the target cell) while not transmitting the P_oldx packets, i.e., in this example none before CSN2=20.

At the eighth step shown in FIG. 4, the seventh step may be performed until the following condition is fulfilled: CSN2=20 (=P_oldLast) has already been sent over the second MRB PTM leg.

At the ninth step shown in FIG. 4, when the predetermined condition of the eighth step is met, target BS 130 may set up a split the second MRB for the UE 110, and optionally release the first MRB, and send the subsequent buffered packets over a split PTP leg of the split second MRB. For example, CSN1=14 associated with the PDCP SN=34 of the MRB2 is sent over the PTP-leg of MRB2 until catching up with the PDCP PDUs sent over a PTM leg of the second MRB, in the example CSN2=21 using PDCP SN=35.

In another embodiment, the PTP leg of MRB2 need not be set up or at least need not be used. Instead, the subsequent buffered packets can be transmitted over the configured MRB1 by the target BS 130 to the UE 110. Thus, in general, the dedicated communication channel (i.e., either PTP leg of MRB2 or MRB1 configuration) used for step 6 and 7 can be used in step 9 for transmitting the packet CSN1=14 associated with the PDCP SN=34.

When the dedicated channel is PTP leg of MRB2, then the subsequently transmitted packets are allocated with a protocol entity sequence number ordering of the second MRB which is the same for both the dedicated channel and the point-to-multipoint leg. However, when the dedicated channel follows the MRB1 configuration, then the subsequently transmitted packets are allocated with a protocol entity sequence number ordering which may or may not be the same as the ordering of the second MRB.

That is, upon detecting that the last packet of the first set has been transmitted to UE 110, target BS 130 may transmit subsequently buffered packets to UE 110 over a leg of the second MRB configuration, wherein the subsequent buffered packets are allocated with a SN of the second MRB configuration. Upon detecting that a last buffered packet of the first set sent using said leg of the second MRB configuration to UE 110 corresponds to a last packet sent to other UEs, like UE 112, using another leg of the second MRB configuration, target BS 130 may transmit subsequent packets to UE 110 and said other user equipments using said another leg of the second MRB configuration. The transmission over said leg of the second MRB configuration to UE 110 may continue until a SN applied on said leg of the second MRB configuration equals the SN applied on said another leg of the second MRB configuration (when SN=34 has been transmitted to UE 110 in this example). Said leg of the second MRB configuration may be a PTP leg and said another leg of the second MRB configuration may be a PTM leg.

It is noted that a PDCP entity of UE 110 may not need to be reestablished for the first MRB at the time of the handover. In this case, target BS 130 may transit the forwarded packets with PDCP SN starting from 0.

Figure 5:
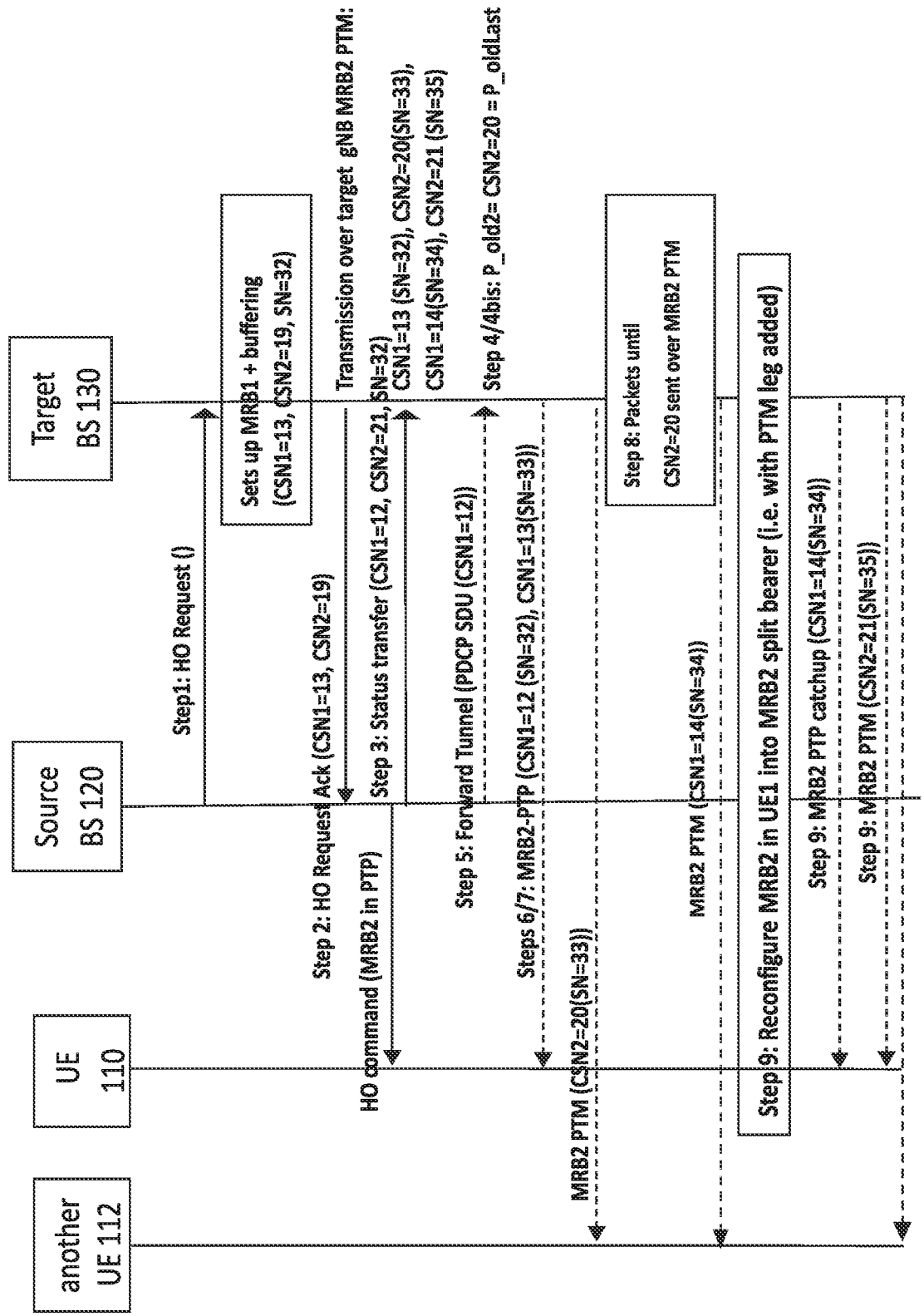
FIG. 5 illustrates a second exemplary signalling graph in accordance with at least some example embodiments.

FIG. 5 illustrates a second signalling graph in accordance with some example embodiments. With reference to FIG. 1, from the left to the right, another UE 112, UE 110, source BS 120 and target BS 130 are shown. The second signalling graph of FIG. 5 is the same as the first signalling graph of FIG. 4 otherwise, but target BS 130 may transmit the first set using a non-split PTP leg of the second MRB configuration as the dedicated communication channel, wherein the SN used for transmission of the at least one packet of the first set is allocated by the apparatus based on the first MRB instead of a SN used for a previous transmission of the at least one packet of the first set by target BS 130 using the second MRB for other UEs.

For instance, the following changes may be applied compared to the first signalling graph of FIG. 4. At the second step, target BS 130 may include an RRC HO Command reconfiguration message to setup a non-split second MRB PTP configuration towards UE 110, i.e., between target BS 130 and UE 110. Transmission status at source BS 120 may be CSN1=11 (transmitted), CSN1=12 (not transmitted), CSN1=13 (not transmitted), CSN2=20 (transmitted), CSN2=21 (not transmitted).

Source BS 120 may transmit a HO command to UE 110, to release the first MRB and configure a second MRB2 with a new PDCP entity for which the PDCP state variables at UE 110 may be initialized based on a first received PDCP PDU. There may be no duplicate detection at a PDCP layer at UE 110. The duplicates may be taken care of by target BS 130. The Hyper Frame Number, HFN, and SN status included in the third step shown as SN=32 in FIG. 5 may be useful only when source BS 120 and target BS 130 have the same mapping of QoS flows to MRB. Otherwise, target BS 130 should select a PDCP SN based on a number of core network packets that need to be transmitted to UE 110 so that the PDCP sequence numbers can continue without a gap at the ninth step.

At the sixth and seventh steps, the packets may be sent over the non-split second MRB PTP bearer, in which case target BS 130 needs to separate individual per UE PDCP entities and buffering to be able to allocate the PDCP SN as would have been sent over the first MRB i.e. different than the "common PDCP entity" of the second MRB, or at least apply separate handling of PDCP SNs per individual UE until the ninth step. At the ninth step, the non-split MRB PTP bearer for UE 110 may be reconfigured into a split second MRB to enable UE 110 to receive packets over a PTM leg of the second MRB as well. The catch may happen over a PTP leg of the second MRB.

Figure 6:
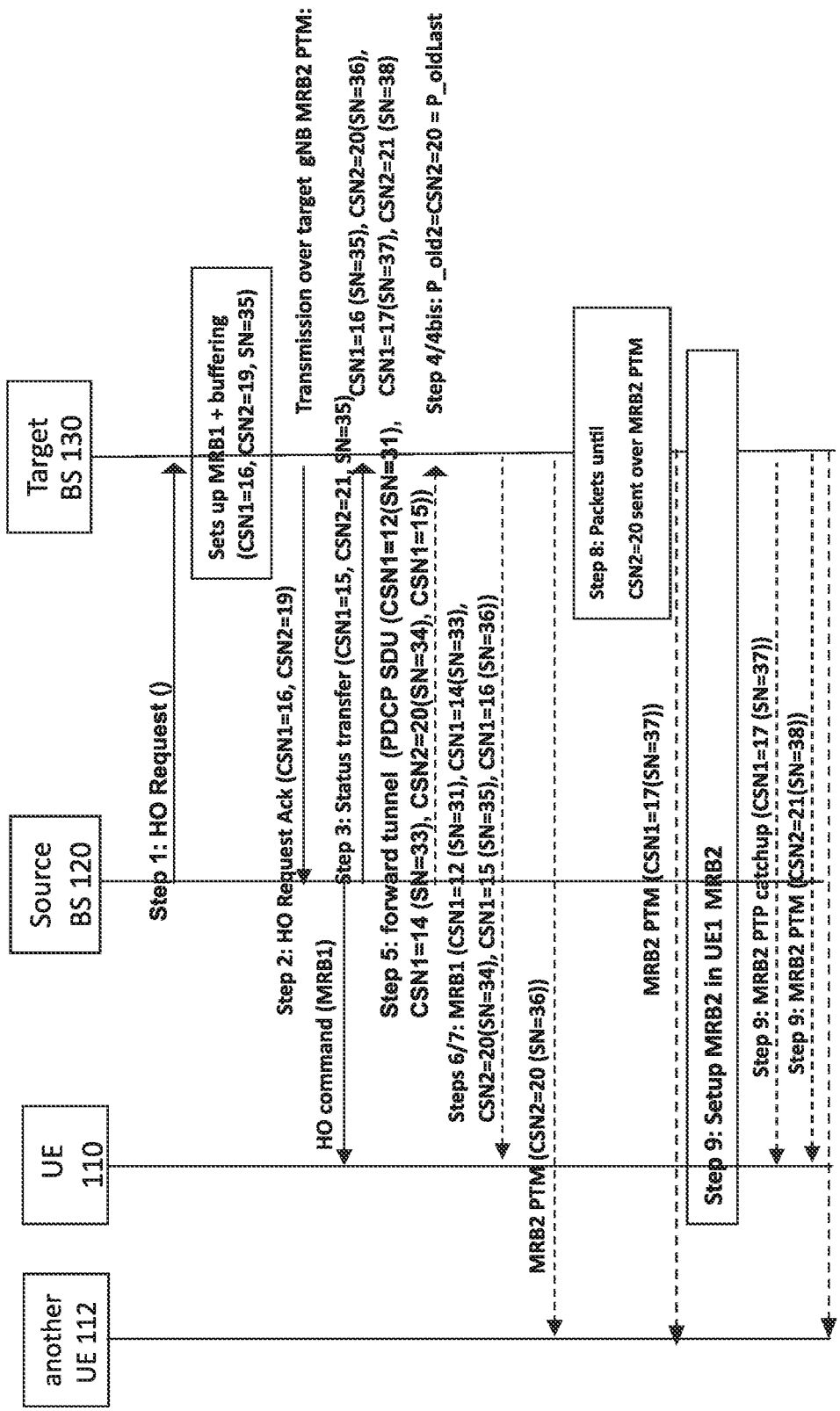
FIG. 6 illustrates a third exemplary signalling graph in accordance with at least some example embodiments.

FIG. 6 illustrates a third signalling graph in accordance with some example embodiments. With reference to FIG. 1, from the left to the right, another UE 112, UE 110, source BS 120 and target BS 130 are shown. A handover in case of a PTP RLC AM, may be performed in the same way as shown in the first signalling graph of FIG. 4 otherwise, but with the following changes.

At the fifth step, the PDCP SDUs which were sent to UE 110 by source BS 120 but not acknowledged by UE 110 at source BS 120 (CSN1=12, CSN1=14 and CSN2=20) may be forwarded to target BS 130 associated with the PDCP SN which was used at source BS 120 to send them to UE 110 (respectively SN=31, SN=33, SN=34). That is, delivering packets may refer to transmitting, by source BS 120, the packets which are not acknowledged by UE 110. The PDCP SDUs may be sent first before sending the PDCP SDUs not yet transmitted by source BS 120 to UE 110, wherein the PDCP SDUs are SDUs which target BS 130 could not buffer as per the indication sent at the second step which is CSN1=15 in the example of FIG. 6.

Transmission status at source BS 120 may be CSN1=11 (SN=30), CSN1=12 (SN=31, not acked), CSN1=13 (SN=32, acked), CSN1=14 (SN=33, not acked), CSN1=15 (not sent). CSN2=20 (SN=34, not acked), CSN2=21 (not sent).

UE 110 may send a PDCP status report indicating the received and missing PDCP PDUs. For these PDCP PDUs, UE 110 and the network may have the same PDCP SN mapping. The sixth step may not be changed meaning that due to update at the fifth step, the packets sent over the first MRB to UE 110 will be the first packets sent but not acknowledged at source BS 120 (i.e. CSN1=12 with SN=31, CSN1=14 with SN=33 and CSN2=20 with SN=34) followed by the packets not yet transmitted by source BS 120 to UE 110 and which the target could not buffer as per the indication sent at the second step. In this case CSN1=15 using a PDCP SN in continuation of the first MRB which is SN=35.

Figure 7:
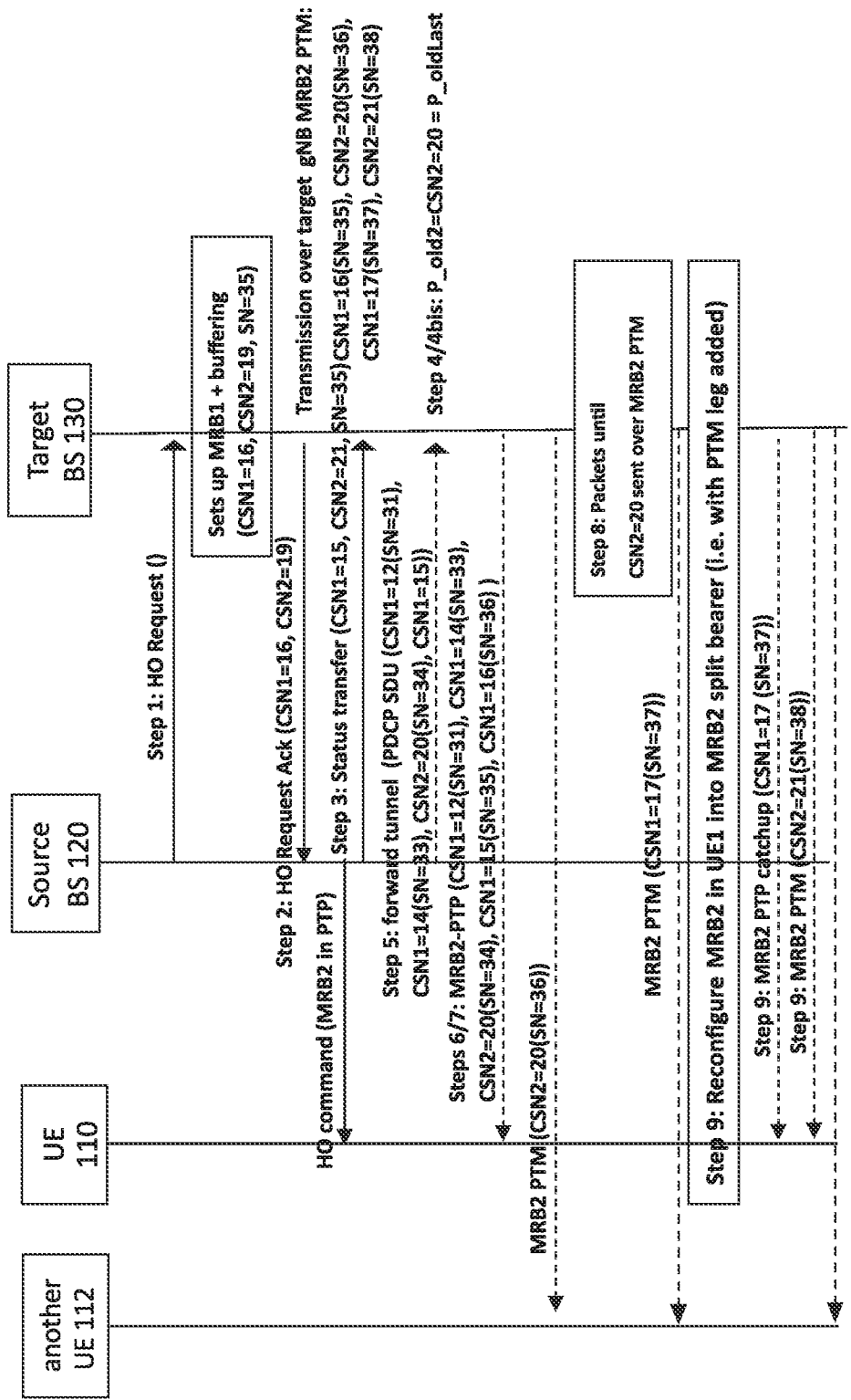
FIG. 7 illustrates a fourth exemplary signalling graph in accordance with at least some example embodiments.

FIG. 7 illustrates a fourth signalling graph in accordance with some example embodiments. With reference to FIG. 1, from the left to the right, another UE 112, UE 110, source BS 120 and target BS 130 are shown. The fourth signalling graph of FIG. 7 may be derived from the third signalling graph of FIG. 6 in the same way as the second signalling graph of FIG. 5 may be derived from the first signalling graph of FIG. 4, i.e., substituting at target BS 130 the use of the first MRB by the use of a non-split second MRB PTP bearer. BS implementation may ensure that when selecting the PDCP SNs for the transmission at sixth and seventh steps, so that when the bearer type change at the ninth step 9 occurs there is no gap in PDCP SNs. A gap in PDCP SNs may be recovered with t-Reordering expiry which only introduces additional delay if t-Reordering is configured.

Transmission status at source BS 120 may be CSN1=11 (SN=30), CSN1=12(SN=31, not acked), CSN1=13 (SN=32, acked), CSN1=14 (SN=33, not acked), CSN1=15 (not sent). CSN2=20 (SN=34, not acked), CSN2=21 (not sent).

The above examples illustrate cases where the same MBS QoS flows were mapped to MRB both in source BS 120 and target BS 130. Nevertheless, in some embodiments, the mapping may be different in source BS 120 and target BS 130. For instance, the mapping of MBS QoS flows to MRBs could be such that source BS 120 applies a first MRB carrying MBS QoS flows 1 and 2, and a second MRB carrying MBS QoS flow 3. Target BS 130 may then apply a third MRB carrying MBS QoS flows 1, 2 and 3. In such a case, target BS 130 may configure for the HO of UE 110 a temporary first MRB and second MRB which are used as long as needed to get UE 110 in sync with the third MRB in target BS 130. Then, UE 110 may be reconfigured such that the first MRB and the second MRB are released and the third MRB is setup and UE 110 initialises PDCP from the first received PDCP PDU.

Figure 8:
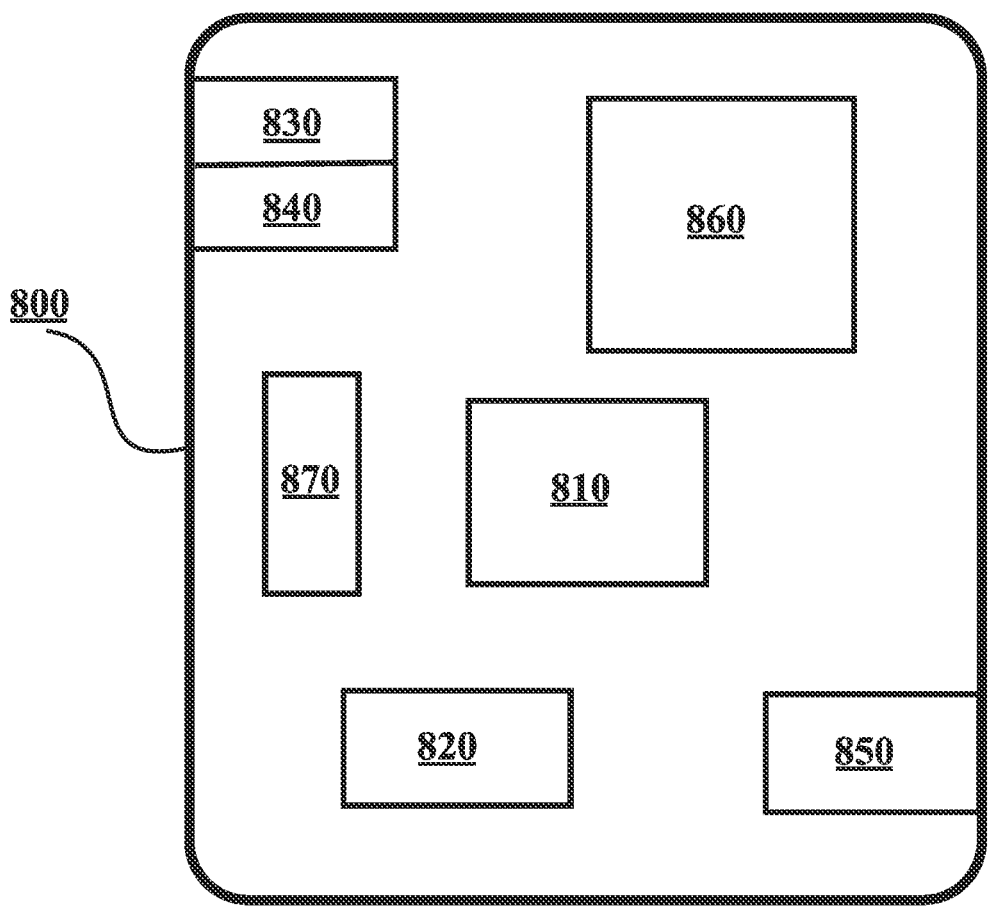
FIG. 8 illustrates an example apparatus capable of supporting at least some example embodiments.

FIG. 8 illustrates an example apparatus capable of supporting at least some embodiments. Illustrated is device 800, which may comprise, for example, source BS 120 or target BS 130, or a device controlling functioning thereof. Comprised in device 800 is processor 810, which may comprise, for example, a single- or multi-core processor wherein a single-core processor comprises one processing core and a multi-core processor comprises more than one processing core. Processor 810 may comprise, in general, a control device. Processor 810 may comprise more than one processor. Processor 810 may be a control device. A processing core may comprise, for example, a Cortex-A8 processing core manufactured by ARM Holdings or a Steamroller processing core produced by Advanced Micro Devices Corporation. Processor 810 may comprise at least one Qualcomm Snapdragon and/or Intel Atom processor. Processor 810 may comprise at least one Application-Specific Integrated Circuit, ASIC. Processor 810 may comprise at least one Field-Programmable Gate Array, FPGA. Processor 810 may be means for performing method steps in device 800. Processor 810 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 800 may comprise memory 820. Memory 820 may comprise random-access memory and/or permanent memory. Memory 820 may comprise at least one RAM chip. Memory 820 may comprise solid-state, magnetic, optical and/or holographic memory, for example. Memory 820 may be at least in part accessible to processor 810. Memory 820 may be at least in part comprised in processor 810. Memory 820 may be means for storing information. Memory 820 may comprise computer instructions that processor 810 is configured to execute. When computer instructions configured to cause processor 810 to perform certain actions are stored in memory 820, and device 800 overall is configured to run under the direction of processor 810 using computer instructions from memory 820, processor 810 and/or its at least one processing core may be considered to be configured to perform said certain actions. Memory 820 may be at least in part comprised in processor 810. Memory 820 may be at least in part external to device 800 but accessible to device 800.

Device 800 may comprise a transmitter 830. Device 800 may comprise a receiver 840. Transmitter 830 and receiver 840 may be configured to transmit and receive, respectively, information in accordance with at least one cellular or non-cellular standard. Transmitter 830 may comprise more than one transmitter. Receiver 840 may comprise more than one receiver. Transmitter 830 and/or receiver 840 may be configured to operate in accordance with Global System for Mobile communication, GSM, Wideband Code Division Multiple Access, WCDMA, 5G, Long Term Evolution, LTE, IS-95, Wireless Local Area Network, WLAN, Ethernet and/or Worldwide Interoperability for Microwave Access, WiMAX, standards, for example.

Device 800 may comprise a Near-Field Communication, NFC, transceiver 850. NFC transceiver 850 may support at least one NFC technology, such as Bluetooth, Wibree or similar technologies.

Device 800 may comprise User Interface, UI, 860. UI 860 may comprise at least one of a display, a keyboard, a touchscreen, a vibrator arranged to signal to a user by causing device 800 to vibrate, a speaker and a microphone. A user may be able to operate device 800 via UI 860, for example to accept incoming telephone calls, to originate telephone calls or video calls, to browse the Internet, to manage digital files stored in memory 820 or on a cloud accessible via transmitter 830 and receiver 840, or via NFC transceiver 850, and/or to play games.

Device 800 may comprise or be arranged to accept a user identity module 870. User identity module 870 may comprise, for example, a Subscriber Identity Module, SIM, card installable in device 800. A user identity module 870 may comprise information identifying a subscription of a user of device 800. A user identity module 870 may comprise cryptographic information usable to verify the identity of a user of device 800 and/or to facilitate encryption of communicated information and billing of the user of device 800 for communication effected via device 800.

Processor 810 may be furnished with a transmitter arranged to output information from processor 810, via electrical leads internal to device 800, to other devices comprised in device 800. Such a transmitter may comprise a serial bus transmitter arranged to, for example, output information via at least one electrical lead to memory 820 for storage therein. Alternatively to a serial bus, the transmitter may comprise a parallel bus transmitter. Likewise processor 810 may comprise a receiver arranged to receive information in processor 810, via electrical leads internal to device 800, from other devices comprised in device 800. Such a receiver may comprise a serial bus receiver arranged to, for example, receive information via at least one electrical lead from receiver 840 for processing in processor 810. Alternatively to a serial bus, the receiver may comprise a parallel bus receiver.

Device 800 may comprise further devices not illustrated in FIG. 8. For example, where device 800 comprises a smartphone, it may comprise at least one digital camera. Some devices 800 may comprise a back-facing camera and a front-facing camera, wherein the back-facing camera may be intended for digital photography and the front-facing camera for video telephony. Device 800 may comprise a fingerprint sensor arranged to authenticate, at least in part, a user of device 800. In some embodiments, device 800 lacks at least one device described above. For example, some devices 800 may lack a NFC transceiver 850 and/or user identity module 870.

Processor 810, memory 820, transmitter 830, receiver 840, NFC transceiver 850, UI 860 and/or user identity module 870 may be interconnected by electrical leads internal to device 800 in a multitude of different ways. For example, each of the aforementioned devices may be separately connected to a master bus internal to device 800, to allow for the devices to exchange information. However, as the skilled person will appreciate, this is only one example and depending on the embodiment various ways of interconnecting at least two of the aforementioned devices may be selected without departing from the scope of the embodiments.

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

Figure 9:
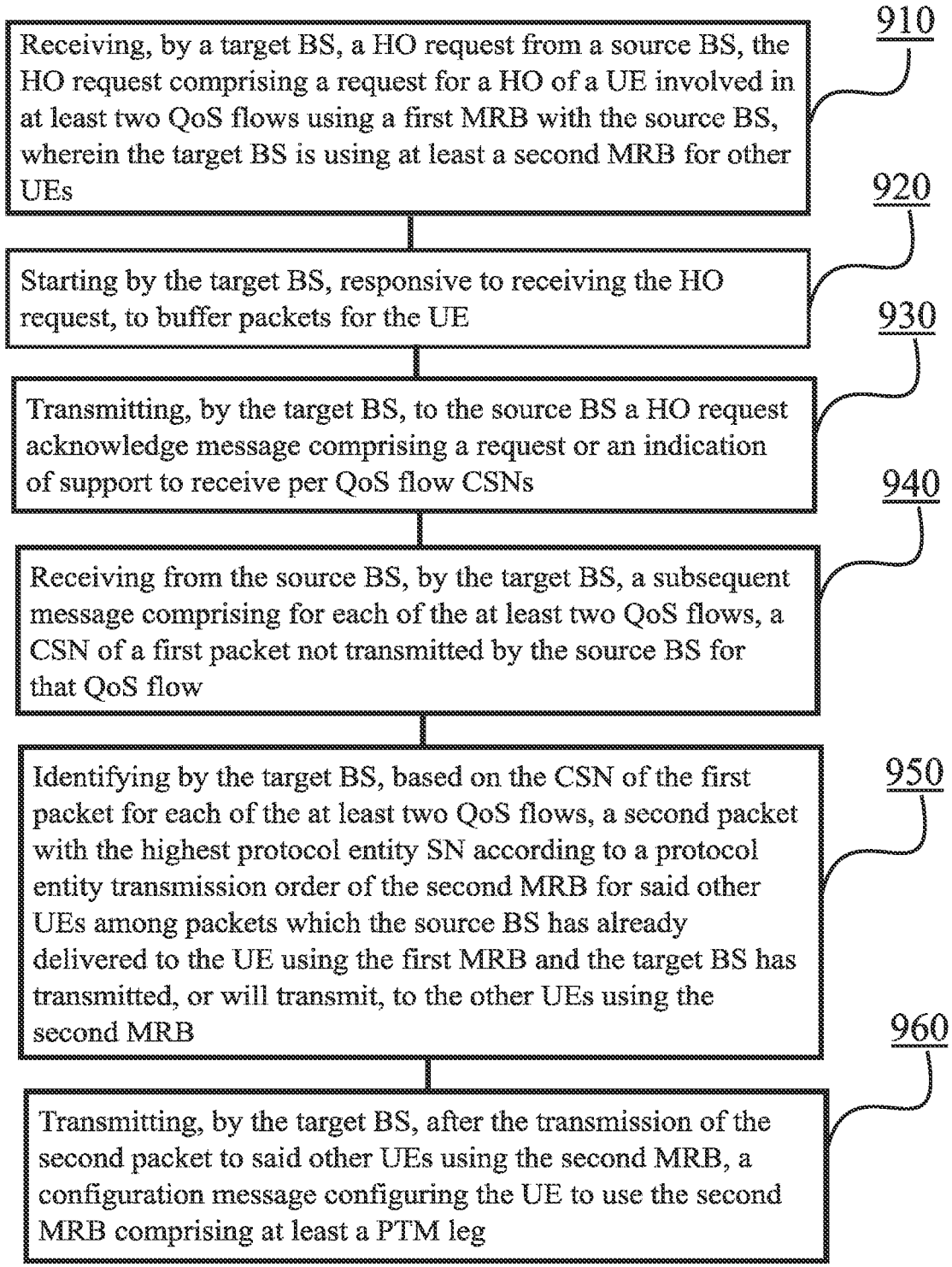
FIG. 9 illustrates a flow graph of a method in accordance with at least some example embodiments.

FIG. 9 is a flow graph of a method in accordance with at least example some embodiments. The phases of the illustrated method may be performed by target BS 130 by a control device configured to control the functioning thereof, possibly when installed therein.

The method may comprise, at step 910, receiving a HO request from a source BS, the HO request comprising a request for a HO of a UE involved in at least two QoS flows using a first MRB with the source BS, wherein the target BS is using at least a second MRB for other UE. The method may further comprise, at step 920, starting, responsive to receiving the HO request, to buffer packets for the UE. At step 930, the method may comprise transmitting to the source BS a HO request acknowledge message comprising a request or an indication of support to receive per QoS flow CSNs. At step 940, the method may comprise receiving a subsequent message, from the source BS comprising for each of the at least two QoS flows, a CSN of a first packet not transmitted by the source BS for that QoS flow At step 950, the method may comprise identifying, based on the CSN of the first packet for each of the at least two QoS flows, a second packet with the highest protocol entity sequence number according to a protocol entity transmission order of the second MRB for said other UEs among packets which the source BS has already delivered to the UE using the first MRB and the target BS has transmitted, or will transmit, to the other UEs using the second MRB. Finally, the method may comprise, at step 960, transmitting, after the transmission of the second packet to said other UEs using the second MRB, a configuration message configuring the UE to use the second MRB comprising at least a PTM leg.

From point of view of the user equipment 110, the UE may receive a handover command from the source BS. In an embodiment, this command is accompanied with a configuration message configuring the UE with the dedicated communication channel to be used with the target BS. After being handed over to the target cell controlled by the target BS, the UE may receive at least packets of the first set via the dedicated communication channel (which may be a PTP leg of the second MRB, or a communication channel to which the MRB1 configuration is applied to). After the predetermined condition is met, as explained earlier, the UE may start to receive some packets via the PTP leg of the second MRB to catch up with the PDCP SNs used by the target BS to transmit packets to the other UEs in the target cell. After the UE receives a reconfiguration message configuring the second MRB with the PTM leg, the UE 110 may also start to be served by the PTM leg of the second MRB.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an exemplary embodiment, an apparatus, such as, for example, source BS 120 or target BS 130, or a control device configured to control the functioning thereof, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example source BS 120 or target BS 130, or a control device configured to control the functioning thereof, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

ACRONYMS LIST

3GPP 3$^{rd}$ Generation Partnership Project
ACK Acknowledgement
AM Acknowledged Mode
ASIC Application-Specific Integrated Circuit
BS Base Station
CN SN Core Network SN (also CSN)
DRB Data Radio Bearer
FPGA Field-Programmable Gate Array
GSM Global System for Mobile communication
GTP-U GPRS Tunnelling Protocol-User data tunnelling
HFN Hyper Frame Number
HO Handover
IoT Internet of Things
LTE Long-Term Evolution
M2M Machine-to-Machine
MBS Multicast and Broadcast Service
MRB MBS Radio Bearer
NFC Near-Field Communication
NGPA NG Application Protocol
NR New Radio
PDCP Packet Data Convergence Protocol
PDU Protocol Data Unit
PTM Point-To-Multipoint
PTP Point-To-Point
QoS Quality of Service
RAN Radio Access Network
RAT Radio Access Technology
RLC Radio Link Control
RRC Radio Resource Control
SDU Service Data Unit
SIM Subscriber Identity Module
SN Sequence Number
UE User Equipment
UI User Interface
UM Unacknowledged Mode
WCDMA Wideband Code Division Multiple Access
WLAN Wireless Local Area Network
WiMAX Worldwide Interoperability for Microwave Access

The invention claimed is:

1. An apparatus comprising at least one processing core, at least one memory including computer program code, the at least one memory and the computer program code being configured to, with the at least one processing core, cause the apparatus at least to:
   receive a handover request from a source base station, the handover request comprising a request for a handover of a user equipment involved in at least two Quality of Service, QoS, flows using a first multicast and broadcast service radio bearer, MRB, with the source base station, wherein the apparatus is using at least a second MRB for other user equipments;
   start, responsive to receiving the handover request, to buffer packets for the user equipment;
   receive a subsequent message, from the source base station comprising for each of the at least two QoS flows, a core network sequence number of a first packet not transmitted by the source base station for that QoS flow;
   identify, based on the core network sequence number of the first packet for each of the at least two QoS flows, a second packet with the highest protocol entity sequence number according to a protocol entity transmission order of the second MRB for said other user equipments among packets which the source base station has already delivered to the user equipment using the first MRB and the apparatus has transmitted, or will transmit, to the other user equipments using the second MRB;
   identify, for each QoS flow for which the apparatus is behind in packet transmission compared to the source base station, at least one packet among the packets buffered at the apparatus which have already been transmitted by the source base station to the user equipment;
   refrain from transmitting the at least one packet to the user equipment; and
   transmit, after the transmission of the second packet to said other user equipments using the second MRB, a configuration message configuring the user equipment to use the second MRB comprising at least a point-to-multipoint leg.

2. The apparatus according to claim 1, wherein the subsequent message from the source base station comprising for each of the at least two QoS flows, the core network sequence number of the first packet not delivered by the source base station for that QoS flow, is an XnAP or NG Application Protocol, NGAP, Status Transfer message.

3. The apparatus according to claim 1, wherein the protocol entity is a Packet Data Convergence Protocol, PDCP.

4. The apparatus according to claim 1, wherein:
   the configuration message also comprises at least a configuration of a dedicated communication channel, or
   a handover request acknowledge message comprises a configuration of a dedicated communication channel and the configuration message configuring the user equipment to use the second MRB comprises a reconfiguration from the dedicated communication channel.

5. The apparatus according to claim 4, wherein the protocol entity of the dedicated communication channel at the apparatus is serving the same QoS flows as the first MRB at the source base station and a protocol entity transmission order is according to the first MRB of the source base station.

6. The apparatus according to claim 4, wherein the configuration of the first MRB is applied on the dedicated communication channel.

7. The apparatus according to claim 4, wherein the at least one memory and the computer program code are further configured to, with the at least one processing core, cause the apparatus at least to:
identify a first set of at least one packet which was not transmitted by the source base station to the user equipment and has a protocol entity sequence number lower than the protocol entity sequence number of the second packet according to the protocol entity transmission order of the second MRB for other UEs,
transmit at least the first set of at least one packet over the dedicated communication channel to the user equipment using a protocol entity transmission order of the dedicated communication channel.

8. The apparatus according to claim 7, wherein the dedicated communication channel is a point-to-point leg of the second MRB and the sequence number used for transmission of the at least one packet of the first set is allocated by the apparatus based on the first MRB transmission order instead of a sequence number used for a transmission of packets by the apparatus using the second MRB transmission order for said other user equipments.

9. The apparatus according to claim 7, wherein the at least one packet of the first set is allocated with at least one sequence number subsequent to a last sequence number used by the source base station on the first MRB, instead of a sequence number based on the protocol entity transmission order of the second MRB for said other user equipments.

10. The apparatus according to claim 7, wherein the first set is transmitted over the dedicated communication channel to the user equipment, and the first set comprises at least one of:
at least one packet not yet transmitted to the user equipment by the source base station and not buffered by the apparatus, or
at least one packet not yet transmitted to the user equipment by the source base station and buffered by the apparatus.

11. The apparatus of claim 10, wherein the first set further comprises: at least one packet transmitted to the user equipment by the source base station but for which the source base station has not received a reception acknowledgement from the user equipment.

12. The apparatus according to claim 7, wherein the at least one memory and the computer program code are further configured to, with the at least one processing core, cause the apparatus at least to:
determine that the first set comprises at least one packet not buffered by the apparatus;
receive from the source base station the at least one packet comprised in the first set but not buffered by the apparatus; and
transmit, to the user equipment, the at least one packet comprised in the first set but not buffered by the apparatus before transmitting other packets in the first set to the user equipment, wherein the at least one packet not buffered by the apparatus is allocated with a sequence number subsequent to a last sequence number used by the source base station for the first MRB.

13. The apparatus according to claim 7, wherein the at least one memory and the computer program code are further configured to, with the at least one processing core, cause the apparatus at least to:
determine that the first set comprises at least one packet not buffered by the apparatus;
refrain from transmitting to the user equipment the at least one packet comprised in the first set but not buffered by the apparatus; and
transmit to the user equipment an indication that the at least one packet comprised in the first set but not buffered by the apparatus will not be transmitted to the user equipment.

14. The apparatus according to claim 7, wherein the at least one memory and the computer program code are further configured to, with the at least one processing core, cause the apparatus at least to:
transmit at least one packet subsequent to the at least one packet of the first set to the user equipment over the dedicated channel.

15. The apparatus according to claim 14, wherein the at least one memory and the computer program code are further configured to, with the at least one processing core, cause the apparatus at least to:
upon detecting that the last packet of said at least one packet subsequent to the first set and having a protocol entity sequence number higher than the protocol entity sequence number of the second packet sent using the dedicated channel to the user equipment corresponds to a last packet sent to other user equipments using point-to-multipoint leg of the second MRB configuration, transmit the at least one subsequent packet to the user equipment and to said other user equipments using said point to multipoint leg of the second MRB.

16. The apparatus according to claim 1, wherein the protocol entity transmission order of the second MRB for other UEs is different than a protocol entity transmission order of the first MRB in which the source base station processes the packets.

17. The apparatus according to claim 1, wherein the first MRB is different compared to the second MRB.

18. The apparatus according to claim 1, wherein the at least one memory and the computer program code are further configured to, with the at least one processing core, cause the apparatus at least to:
transmit to the source base station a handover request acknowledge message comprising a request or an indication of support to receive the core network sequence number for each of the at least two QoS flows.

19. The apparatus according to claim 18, wherein the indication of the support to receive the core network sequence numbers causes the source base station to include the core network sequence number for each of the at least two QoS flows in the subsequent message.

* * * * *